(12) United States Patent
Busscher et al.

(10) Patent No.: US 10,589,834 B2
(45) Date of Patent: Mar. 17, 2020

(54) RETENTION OF AN ELECTRO-OPTIC WINDOW ASSEMBLY

(71) Applicant: Gentex Corporation, Zeeland, MI (US)

(72) Inventors: Bradley L. Busscher, Grand Rapids, MI (US); David I. Driscoll, Caledonia, MI (US); Andrew T. Mitchell, Hudsonville, MI (US); Kevin L. Ash, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 696 days.

(21) Appl. No.: 15/178,192

(22) Filed: Jun. 9, 2016

(65) Prior Publication Data

US 2016/0362168 A1    Dec. 15, 2016

Related U.S. Application Data

(60) Provisional application No. 62/173,116, filed on Jun. 9, 2015.

(51) Int. Cl.
*B64C 1/14* (2006.01)

(52) U.S. Cl.
CPC .......... *B64C 1/1492* (2013.01); *B64C 1/1484* (2013.01)

(58) Field of Classification Search
CPC ....... B64C 1/1484; B64C 1/1492; B64C 1/14; B64C 1/1407; B64C 1/1476; B64C 1/1461; B64C 1/00; B60J 1/00–1/20; B60J 3/00–3/06; C03C 4/00–4/20
See application file for complete search history.

(56) References Cited

U.S. PATENT DOCUMENTS

| | | | |
|---|---|---|---|
| 3,521,941 A | 7/1970 | Deb et al. | |
| 4,640,583 A | 2/1987 | Hoshikawa et al. | |
| 4,646,158 A | 2/1987 | Ohno et al. | |
| 4,702,566 A | 10/1987 | Tukude | |
| 4,893,908 A | 1/1990 | Wolf et al. | |
| 4,917,477 A | 4/1990 | Bechtel et al. | |

(Continued)

FOREIGN PATENT DOCUMENTS

| | | |
|---|---|---|
| EP | 0947874 | 6/1999 |
| EP | 0947875 | 6/1999 |

(Continued)

OTHER PUBLICATIONS

R. Sullivan et al., "Effect of Switching Control Strategies on the Energy Performance of Electrochromic Windows," SPIE, vol. 2255, pp. 443-455.

(Continued)

*Primary Examiner* — Assres H Woldemaryam
(74) *Attorney, Agent, or Firm* — Price Heneveld LLP; Bradley D. Johnson (57) ABSTRACT

An aircraft window includes an outer window assembly that includes a pressure pane coupled to a pressure pane frame. An inner window assembly includes a bezel adapted to couple to a perimeter of the inner window assembly against the outer window assembly. The bezel has a plurality of attachment features disposed thereon. A plurality of retaining features is disposed around the perimeter of the window. The retention features are configured to engage the attachment features for retaining the inner window assembly on the outer window assembly.

7 Claims, 12 Drawing Sheets

(56) References Cited

U.S. PATENT DOCUMENTS

| | | |
|---|---|---|
| 5,004,961 A | 4/1991 | Berner et al. |
| 5,066,111 A | 11/1991 | Singleton et al. |
| 5,092,939 A | 3/1992 | Nath et al. |
| 5,124,832 A | 6/1992 | Greenberg et al. |
| 5,136,419 A | 8/1992 | Shabrang |
| 5,161,048 A | 11/1992 | Rukavina |
| 5,202,787 A | 4/1993 | Byker et al. |
| 5,228,925 A | 7/1993 | Nath et al. |
| 5,384,578 A | 1/1995 | Lynam et al. |
| 5,384,653 A | 1/1995 | Benson et al. |
| 5,612,847 A | 3/1997 | Malecke et al. |
| 5,654,736 A | 8/1997 | Green et al. |
| 5,657,149 A | 8/1997 | Buffat et al. |
| 5,668,663 A | 9/1997 | Varaprasad et al. |
| 5,724,176 A | 3/1998 | Nishikitani et al. |
| 5,724,187 A | 3/1998 | Varaprasad et al. |
| 5,725,809 A | 3/1998 | Varaprasad et al. |
| 5,805,330 A | 9/1998 | Byker et al. |
| 5,838,483 A | 11/1998 | Teowee et al. |
| 5,889,608 A | 3/1999 | Buffat et al. |
| 5,940,201 A | 8/1999 | Ash et al. |
| 5,995,273 A | 11/1999 | Chandrasekhar |
| 6,020,989 A | 2/2000 | Watanabe |
| 6,045,643 A | 4/2000 | Byker et al. |
| 6,045,724 A | 4/2000 | Varaprasad et al. |
| 6,055,089 A | 4/2000 | Schultz et al. |
| 6,056,410 A | 5/2000 | Hoekstra et al. |
| 6,084,702 A | 7/2000 | Byker et al. |
| 6,137,620 A | 10/2000 | Guarr et al. |
| 6,166,496 A | 12/2000 | Lys et al. |
| 6,207,083 B1 | 3/2001 | Varaprasad et al. |
| 6,210,008 B1 | 4/2001 | Hoekstra et al. |
| 6,239,898 B1 | 5/2001 | Byker et al. |
| 6,245,262 B1 | 6/2001 | Varaprasad et al. |
| 6,254,003 B1 | 7/2001 | Pettinelli et al. |
| 6,407,847 B1 | 6/2002 | Poll et al. |
| 6,433,913 B1 | 8/2002 | Bauer et al. |
| 6,433,914 B1 | 8/2002 | Lomprey et al. |
| 6,471,360 B2 | 10/2002 | Rukavina et al. |
| 6,567,708 B1 | 5/2003 | Bechtel et al. |
| 6,597,489 B1 | 7/2003 | Guarr et al. |
| 6,621,616 B1 | 9/2003 | Bauer et al. |
| 6,770,068 B2 | 8/2004 | Ruiz et al. |
| 6,793,182 B2* | 9/2004 | Hopkins ............... B64C 1/1492 244/129.3 |
| 6,853,472 B2 | 2/2005 | Warner et al. |
| 6,906,632 B2 | 6/2005 | DeLine et al. |
| 6,924,919 B2 | 8/2005 | Hunia et al. |
| 6,961,168 B2 | 11/2005 | Agrawal et al. |
| 6,963,437 B2 | 11/2005 | Bauer et al. |
| 7,085,609 B2 | 8/2006 | Bechtel et al. |
| 7,130,101 B2 | 10/2006 | Rukavina et al. |
| 7,256,923 B2 | 8/2007 | Liu et al. |
| 7,256,924 B2 | 8/2007 | Guarr |
| 7,274,501 B2 | 9/2007 | McCabe et al. |
| 7,397,595 B2 | 7/2008 | Kojima |
| 7,428,091 B2 | 9/2008 | Baumann et al. |
| 7,450,291 B2 | 11/2008 | Guarr et al. |
| 7,471,438 B2 | 12/2008 | McCabe et al. |
| 7,502,156 B2 | 3/2009 | Tonar et al. |
| 7,525,714 B2 | 4/2009 | Poll et al. |
| 7,535,614 B1 | 5/2009 | Tapley et al. |
| 7,822,490 B2 | 10/2010 | Bechtel et al. |
| 7,855,821 B2 | 12/2010 | Baumann et al. |
| 7,990,603 B2 | 8/2011 | Ash et al. |
| 8,169,684 B2 | 5/2012 | Bugno et al. |
| 9,714,078 B2 | 7/2017 | Ebner et al. |
| 2003/0178531 A1* | 9/2003 | Hopkins ............... B64C 1/1492 244/129.3 |
| 2004/0160660 A1 | 8/2004 | Malvino |
| 2005/0063036 A1 | 3/2005 | Bechtel et al. |
| 2005/0150589 A1 | 7/2005 | Amos et al. |
| 2005/0156753 A1 | 7/2005 | DeLine et al. |
| 2005/0200933 A1 | 9/2005 | Weidner |
| 2005/0200935 A1 | 9/2005 | Liu et al. |
| 2005/0270621 A1 | 12/2005 | Bauer et al. |
| 2007/0285759 A1 | 12/2007 | Ash et al. |
| 2008/0030836 A1 | 2/2008 | Tonar et al. |
| 2008/0066971 A1 | 3/2008 | Whang et al. |
| 2009/0015736 A1 | 1/2009 | Weller et al. |
| 2010/0085511 A1 | 4/2010 | Watanabe et al. |
| 2011/0255142 A1 | 10/2011 | Ash et al. |
| 2013/0161971 A1 | 6/2013 | Bugno et al. |
| 2013/0278989 A1 | 10/2013 | Lam et al. |
| 2013/0340957 A1* | 12/2013 | Knowles ............... B64C 1/1484 160/369 |
| 2015/0146277 A1* | 5/2015 | Ash ....................... B64C 1/1492 359/275 |

FOREIGN PATENT DOCUMENTS

| | | |
|---|---|---|
| EP | 0947876 | 6/1999 |
| RU | 2378153 C2 | 1/2010 |
| WO | 9857228 | 12/1998 |
| WO | 2012097176 A1 | 7/2012 |

OTHER PUBLICATIONS

A.W. Czanderna et al., "Durability Issues and Service Lifetime Prediction of Electrochromic Windows for Buildings Applications," Solar Energy Materials & Solar Cells, 56 (1999), pp. 419-436.

* cited by examiner

RETENTION OF AN ELECTRO-OPTIC WINDOW ASSEMBLY

CROSS-REFERENCE TO RELATED APPLICATIONS

This application claims the benefit of and priority to U.S. Provisional Patent Application No. 62/173,116, filed on Jun. 9, 2015, entitled "RETENTION OF AN ELECTRO-OPTIC WINDOW ASSEMBLY," the entire disclosure of which is hereby incorporated herein by reference.

FIELD OF THE DISCLOSURE

The present disclosure generally relates to an aircraft window mounting assembly, and more specifically, to an aircraft window mounting assembly that includes an electro-optic element.

BACKGROUND OF THE DISCLOSURE

Aircraft window mounting assemblies are being used for the attachment of variable transmissive windows to aircraft. Use of these assemblies may result in increased manufacturing time, cost, and weight of the aircraft. Accordingly, new mounting assembly designs and configurations, along with methods of making them, are needed particularly in view of reducing material and processing costs, improving aesthetics and/or enhancing functionality.

SUMMARY OF THE PRESENT DISCLOSURE

According to one aspect of the present disclosure, an aircraft window has an outer window assembly that includes a pressure pane coupled to a pressure pane frame. An inner window assembly includes a bezel adapted to couple to a perimeter of the inner window assembly against the outer window assembly. The bezel has a plurality of attachment features disposed thereon; and a plurality of retention features disposed around the outer window assembly. The attachment features and the retention features each include hooks configured to engage one another for retaining the inner window assembly on the outer window assembly.

According to another aspect of the present disclosure, an aircraft window includes an outer window assembly including a pressure pane coupled to a pressure pane frame. An inner window assembly includes a bezel adapted to couple to a perimeter of the inner window assembly against the outer window assembly, wherein the bezel has a plurality of rotatable attachment features disposed thereon. A plurality of retention features is disposed around the pressure pane frame of the outer window assembly, the retention features configured to engage the attachment features for retaining the inner window assembly on the outer window assembly.

According to yet another aspect of the present disclosure, an aircraft window includes an outer window assembly including a pressure pane coupled to a pressure pane frame. An inner window assembly includes a bezel adapted to couple to a perimeter of the inner window assembly against the outer window assembly. The inner bezel defines an inner opening having an inner wall. The inner wall defines a channel configured to accept an electro-optic element. A plurality of retention features is disposed around the perimeter of the window and a plurality of attachment features is integrally defined by the bezel. The retention features are configured to engage the attachment features for retaining the inner window assembly on the outer window assembly.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION OF EMBODIMENTS

The present illustrated embodiments reside primarily in combinations of method steps and apparatus components related to aircraft window assemblies. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1A-8B, reference numeral 10 generally designates an aircraft window coupled to an aircraft fuselage 14. The aircraft window 10 generally includes an outer window assembly 18 including a pressure pane 22 coupled to a pressure pane frame 24 and an inner window assembly 28 including a bezel 30 adapted to couple to a perimeter of the inner window assembly 28 against the outer window assembly 18. The bezel 30 includes a plurality of attachment features 34 disposed around the bezel 30. A plurality of retention features 38 surround the perimeter of the aircraft window 10 and are configured to engage the attachment features 34 such that the inner window assembly 28 is retained against the outer window assembly 18.

Referring now to FIGS. 1A-D, the bezel 30 includes an inner wall 50, an outer wall 54 and defines an inner opening 58. The inner wall 50 defines a channel 62. An electro-optic element 66 is disposed in the inner opening 58 and is configured for reception in the channel 62 of the inner wall 50. The electro-optic element 66 may be similar to, or the same as, that disclosed in U.S. Patent Application Publication No. 2013/0161971, now U.S. Pat. No. 10,023,028, which is assigned to Gentex Corporation, the entirety of which is hereby incorporated herein by reference.

It is contemplated that the bezel 30 may take on a variety of shapes, materials, and architectures that will generally define a frame-like structure. The bezel 30 may be formed of materials that hold their shape and conform to aviation requirements relating to resistance to fire and weight. Such materials that may be used for this purpose may be, for example, melamine or polyurethane. In one instance, the bezel 30 is constructed by introduction of a foaming material into a mold cavity of a low pressure molding assembly. The molding process is initiated, and the bezel 30, which may include open cell or closed cell foam, is withdrawn from the mold. In another embodiment, the bezel 30 may be formed of multiple pieces of foam which are placed in a mold, heated and fused together. In other embodiments, the bezel 30 may comprise a plastic. Further, it is contemplated that the electro-optic element 66 may protrude into the bezel 30 only a small distance or may extend to the outer wall 54. The distance that the electro-optic element 66 extends into the bezel 30 will depend on the desired functionality and the desired tolerance and spacing between the pressure pane frame 24 (FIG. 2) and the electro-optic element 66.

Figure 1A:
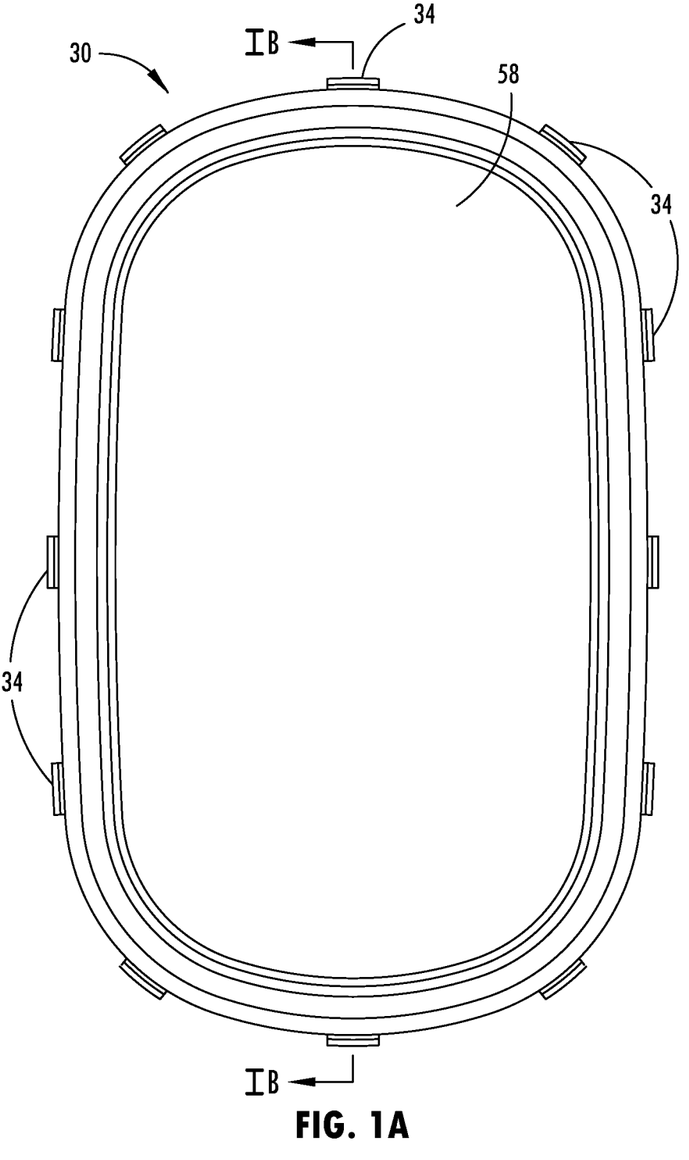
FIG. 1A is a front elevational view of one embodiment of an aircraft window mounting assembly of the present disclosure.
Figure 1B:
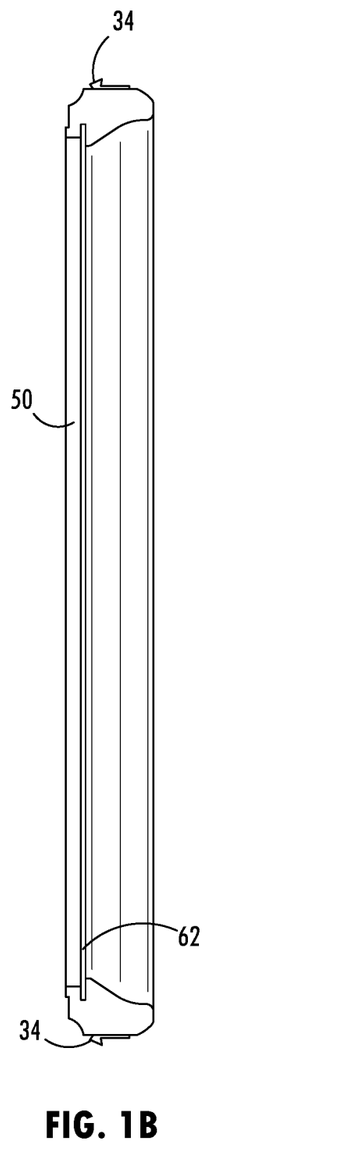
FIG. 1B is a side cross-sectional elevational view of the aircraft window mounting assembly of FIG. 1A taken at line 1B.
Figure 1C:
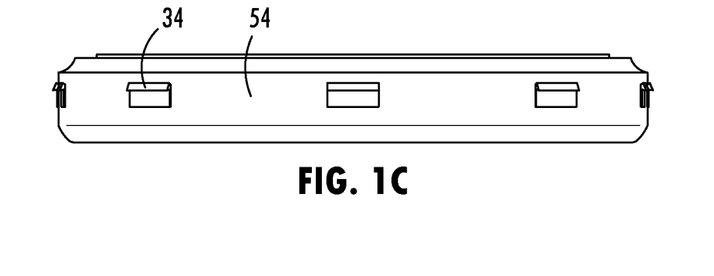
FIG. 1C is a bottom plan view of the aircraft window mounting assembly of FIG. 1A.
Figure 1D:
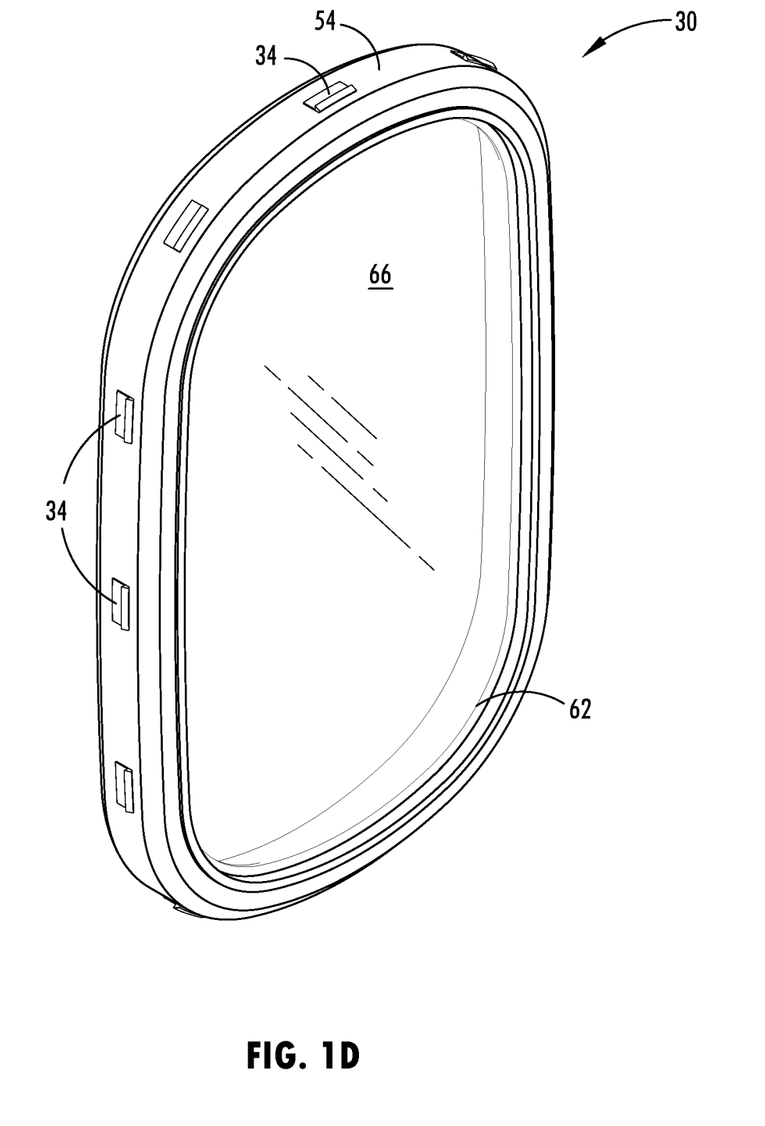
FIG. 1D is a top perspective view of the aircraft window mounting assembly of FIG. 1A
Figure 2:
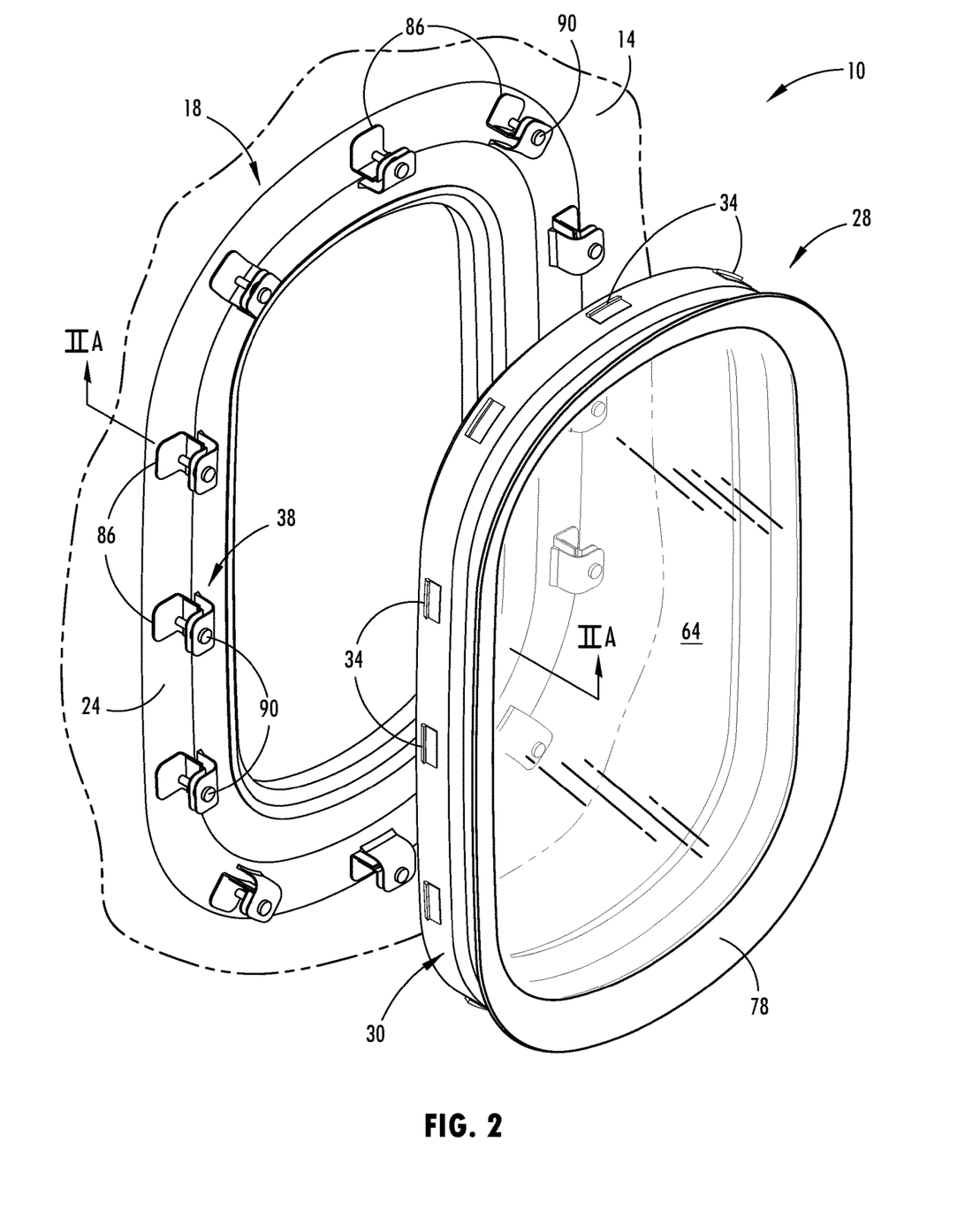
FIG. 2 is an illustration of a partially exploded perspective view of an aircraft window assembly incorporating one embodiment of the aircraft window mounting assembly.
Figure 2A:
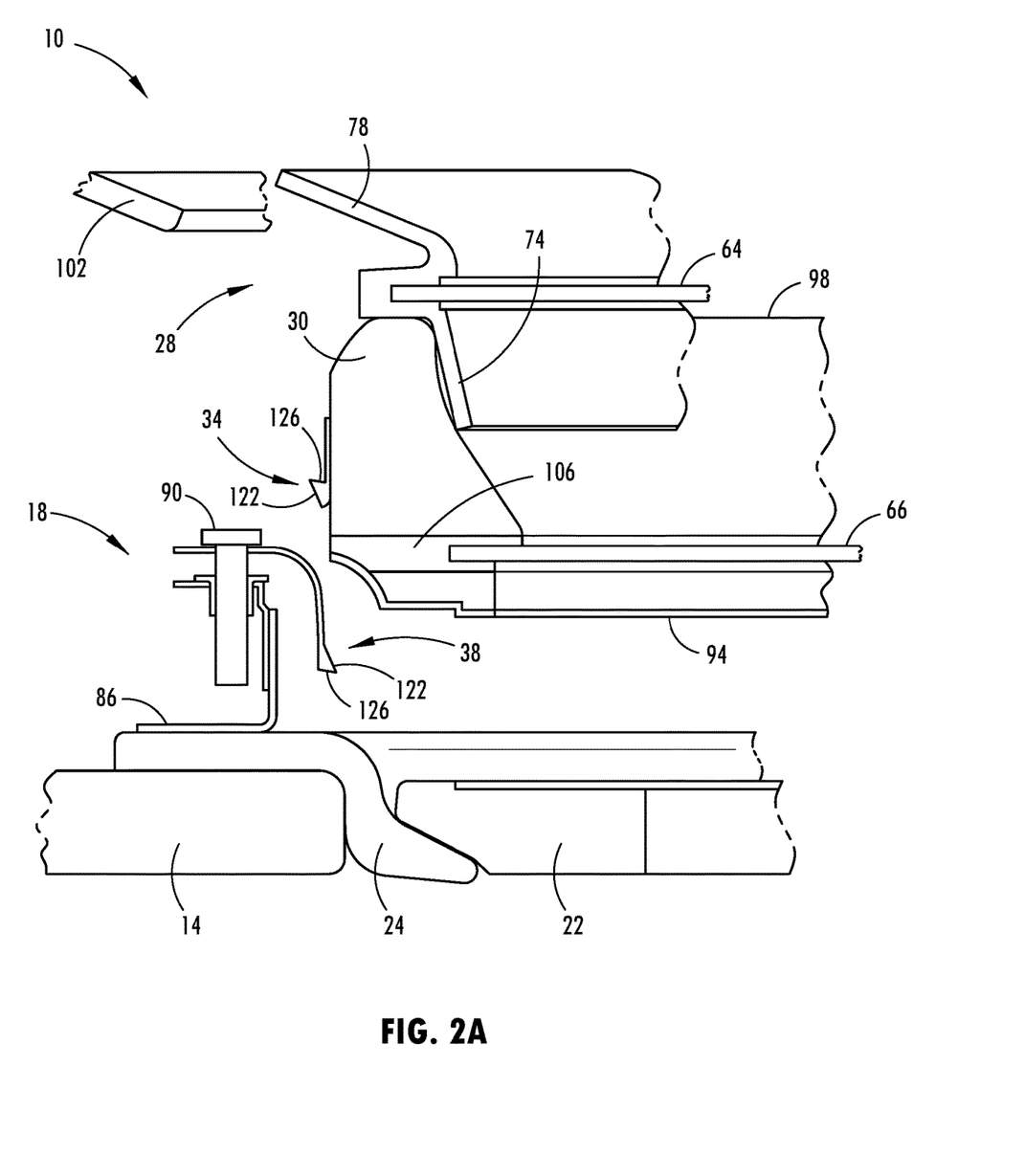
FIG. 2A is an illustration of a cross sectional view taken at line 2A of FIG. 2 of the aircraft window assembly partially exploded.

Referring now to FIGS. 2 and 2A, the inner window assembly 28 includes the bezel 30, an middle reveal 74, the electro-optic element 66, a dust cover 64, and an inner reveal 78. The channel 62 includes a depth and width configured to receive the electro-optic element 66 therein. The dust cover 64 is held in place by an inner reveal 78, which is subsequently held in place by an interior aircraft sidewall 102. The interior aircraft sidewall 102 may include an interior trim to provide an aesthetically pleasing appearance inside an aircraft fuselage.

The exterior window assembly 18 generally includes the pressure pane 22, the pressure pane frame 24, the aircraft fuselage 14, and a plurality of mounting brackets 86. The brackets 86 are mounted to the pressure pane frame 24 and are depicted as generally "L" shaped. In the depicted embodiment, a fastener 90 attaches the retention features 38 to the mounting bracket 86. In some embodiments, the mounting brackets 86 may integrally define the retention features 38, while in other embodiments, the retention features 38 are coupled directly to the pressure pane frame 24 to decrease the part count of the aircraft window 10.

Figure 3:
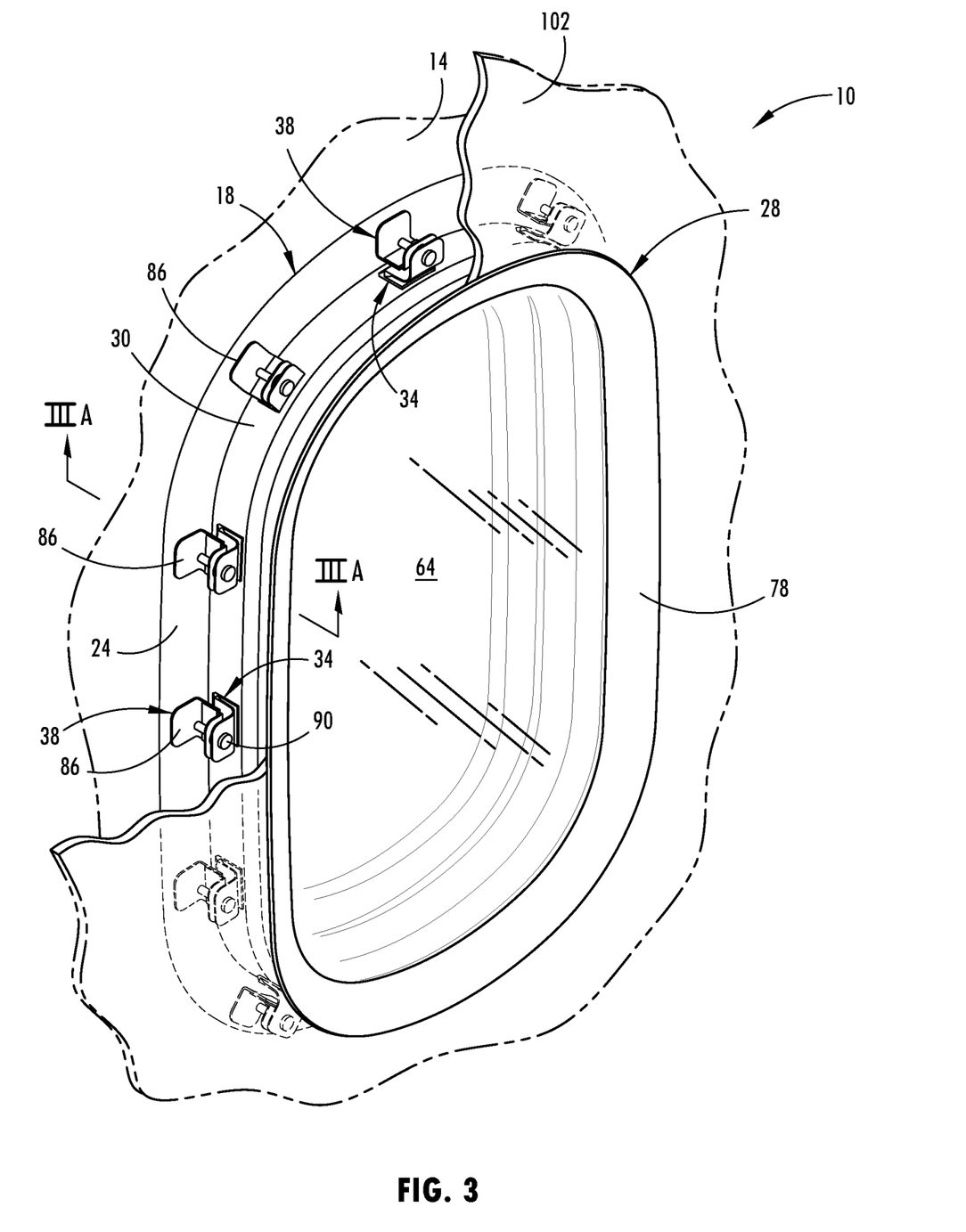
FIG. 3 is a perspective view of the aircraft window after assembly according to one embodiment.
Figure 3A:
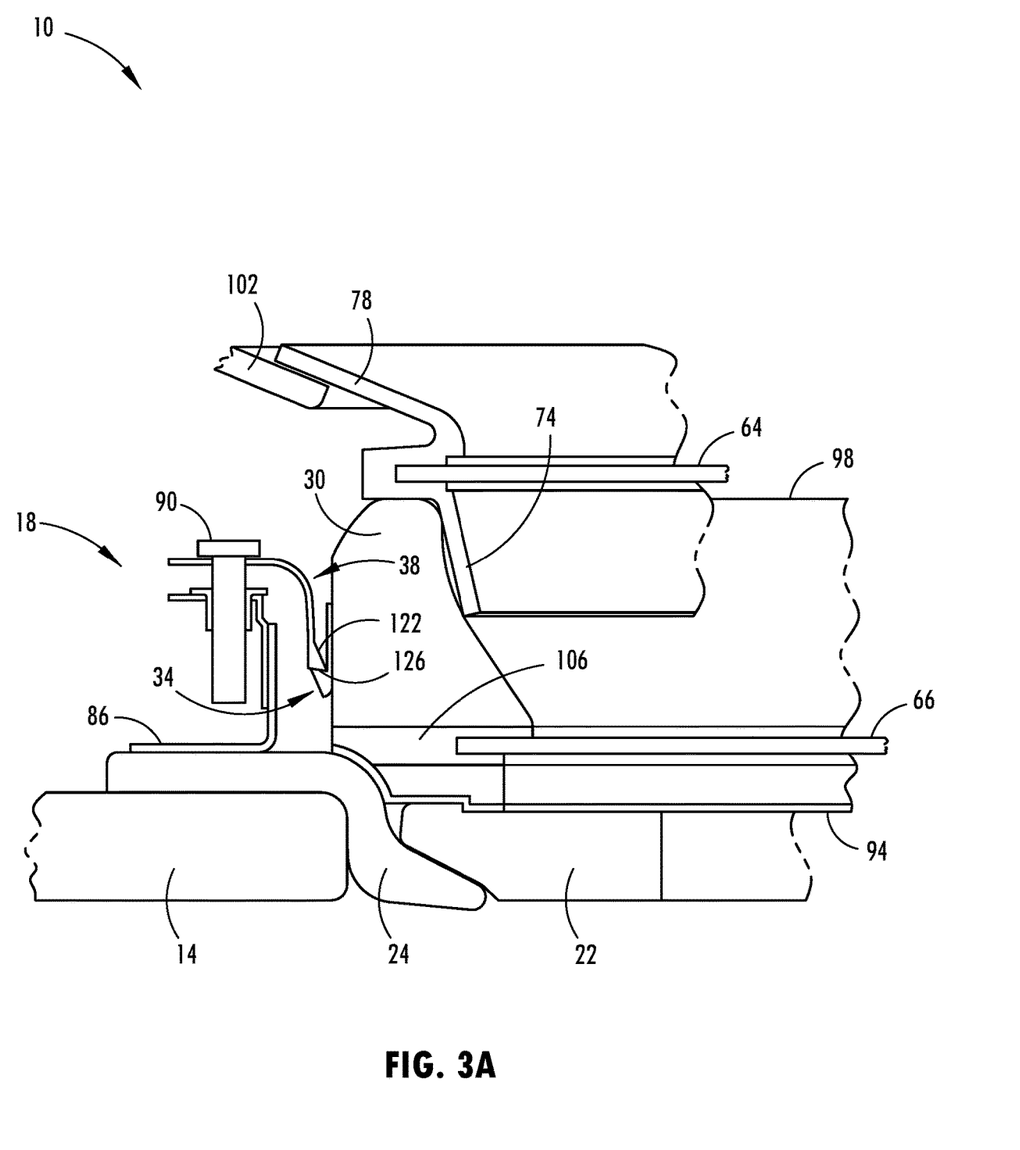
FIG. 3A is an illustration of a cross sectional view of the assembled aircraft window assembly taken at line 3A of FIG. 3.

With reference to FIGS. 3 and 3A, the electro-optic element 66 is generally disposed between the pressure pane 22 and the dust cover 64 in assembly. The bezel 30 is generally configured to nest between the middle reveal 74 and the pressure pane frame 24. The bezel 30 is also proximate the pressure pane 22, and in the illustrated embodiment, is in abutting contact with the pressure pane 22. The pressure pane 22 generally defines a window through which passengers in an aircraft can view outside the aircraft.

The bezel 30 includes an exterior wall 94 configured to abut one or both of the pressure pane 22 and the pressure pane frame 24. The bezel 30 also includes an interior wall 98 configured to abut or nearly abut the middle reveal 74. The interior wall 98 includes a shorter height than the height of the exterior wall 94. Further, the interior wall 98 is generally angled upwardly from the exterior wall 94 to the interior wall 98. The bezel 30 cross section can differ from the illustrated embodiment. However, it will be understood that the bezel 30 secures the electro-optic element 66 in place and may be attached to or formed in the bezel 30. In the illustrated embodiment, the middle reveal 74 is operably coupled with the inner reveal 78 through the dust cover 64. The middle reveal 74 includes a generally L-shaped cross-section and can come in a variety of lengths. In addition, a lower transverse leg of the middle reveal 74 supports a portion of the bezel 30. An upper vertical leg couples with the inner reveal 78. The inner reveal 78 includes a V-shaped configuration with an inner leg abutting the dust cover 64 and an outer leg abutting the interior aircraft sidewall 102.

In some embodiments, the bezel 30 may cooperate with the aircraft fuselage 14 to form an electromagnetic shield. The shield functions to prevent potentially interfering electromagnetic signals from entering and exiting the aircraft at unintended locations. In such embodiments, the bezel 30 may include an electrically conductive member 106 configured to create an electrical connection between the electro-optic element 66 and the pressure pane frame 24. The electrically conductive member 106 may take a variety of forms including both layer and/or insert configurations. In layer embodiments, the electrically conductive member 106 may include physical vapor deposition layer, a thin metal film, a conductive paint, and/or similar coatings and claddings that extend from the electro-optic element 66 to the pressure pane frame 24 on the exterior of the bezel 30. In insert embodiments, as depicted, the electrically conductive member 106 may travel through the bezel 30 in the form of an electrically conductive polymer, metal wire or other conductive material. Additionally, the electrically conductive member 106 may be similar to or the same as that disclosed in U.S. Patent Application Publication No. 2015/0029574, now U.S. Pat. No. 9,403,590, which is assigned to Gentex Corporation, the entirety of which is hereby incorporated herein by reference.

In various embodiments disclosed herein, a bulbous lip may be positioned between the electrically conductive member 106 of the bezel 30 and the pressure pane frame 24. The bulbous lip may define a hollow core along its length and include a polymeric material or other suitable flexible material. The bulbous lip may have a conductive material disposed on an exterior of the lip, or the lip may include a conductive material (e.g., conductive polymer) which cooperates with the electrically conductive member 106 to create an electrical connection between the electro-optic element 66 and the pressure pane frame 24. The bulbous lip may be integrally defined by the bezel 30, or may be a separate component attached after formation of the bezel 30. The hollow core, as well as the positioning of the bulbous lip between the bezel 30 and the pressure pane frame 24, allows the lip to compress and cover a greater surface area of the pressure pane frame 24 when the bezel 30 is compressed into place, thereby creating a greater electrical connection between the electro-optic element 66 and the pressure pane frame 24.

Referring again to FIGS. 2A and 3A, the attachment features 34 and the retention features 38 are configured to engage in a "hook-on-hook" fashion. In the depicted embodiment, the attachment features 34 and the retention features 38 each include a hook 122. The hooks 122 each include an engagement surface 126 configured to engage the corresponding engagement surface 126 of the other hook 122. The hooks 122 of the attachment and retention features 34, 38 are configured to snap-fit together. The hooks 122 may take a variety of shapes and orientations configured to increase or decrease force required to disengage the attachment features 34 from the retention features 38. In one embodiment, the hooks 122 of the retention features 38 are wider than the hooks 122 of the attachment features 34 to allow a predetermined amount of "play" or "slop" in the retaining system. By enlarging one hook 122 relative to another it may make it easier to align the attachment features 34 with the retention features 38 while also creating a greater degree to which the inner window assembly 28 may twist relative to the outer window assembly 18 without resulting in disengagement. In various embodiments, the hook 122 of the attachment features 34 may be integrally defined by the bezel 30. In some embodiments, the attachment features 34 and the retention features 38 may include a metal which is magnetized or include standalone magnets to facilitate easier engagement and a greater retention force between the attachment and retention features 34, 38. Alternatively, some embodiments of the attachment features 34 and the retention features 38 may function solely on the use of magnets for engagement and retention.

During assembly, the attachment features 34 of the inner window assembly 28 are aligned with the retention features 38 of the outer window assembly 18 and the inner window assembly 28 is pressed against the outer window assembly 18. As the inner window assembly 28 is pressed against the outer window assembly 18, the bezel 30 contacts the pressure pane 22, pressure pane frame 24 and begins to compress. The compression of the bezel 30 ensures a tight coupling, or seal, between the inner window assembly 28 and the outer window assembly 18. The attachment features 34 and the retention features 38 are configured to engage one another in a locking relationship once the bezel 30 has been compressed such that the bezel 30 can be held in the compressed state. The number of attachment and retention features 34, 38 on the bezel 30 and the pressure pane frame 24, respectively, may be increased or decreased from the depicted number in order to increase or decrease the force holding the inner window assembly 28 to the outer window assembly 18.

Figure 4:
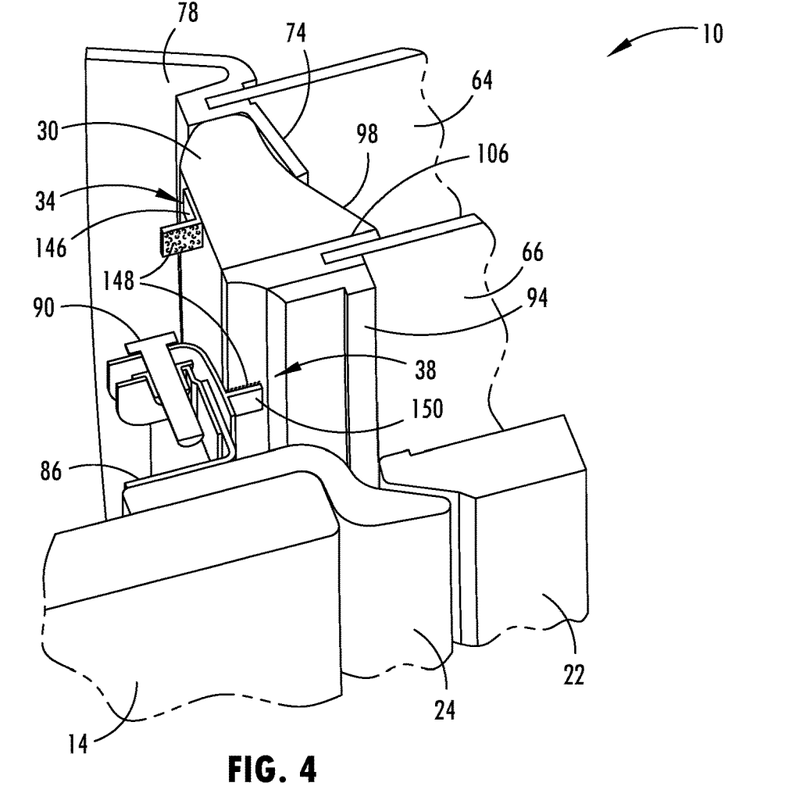
FIG. 4 is a partially exploded bottom perspective view of the aircraft window according to one embodiment.
Figure 4A:
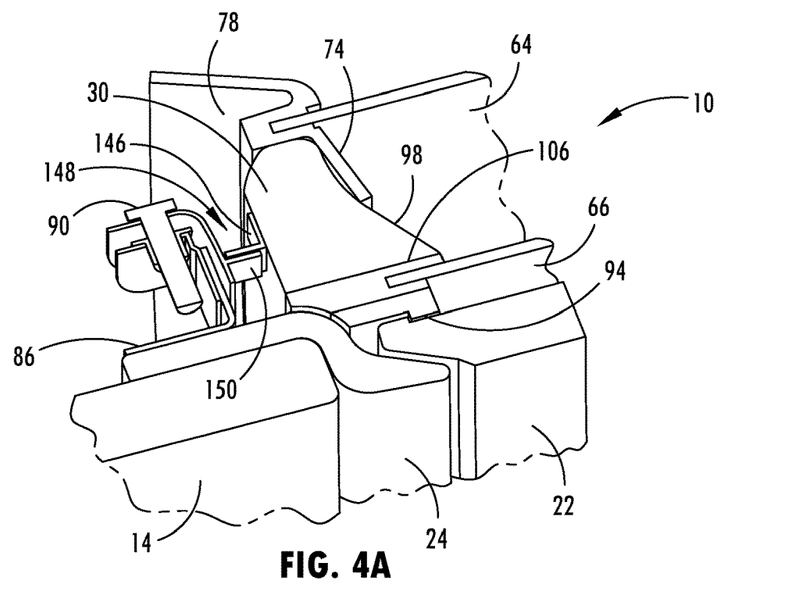
FIG. 4A is a bottom perspective view of the aircraft window after assembly according to the embodiment of FIG. 4.

As explained above, the attachment features 34 and the retention features 38 are capable of taking a variety of different configurations in order to hold the inner window assembly 28 to the outer window assembly 18 and the bezel 30 in a compressed state. Referring now to FIGS. 4 and 4A, the attachment features 34 in the depicted embodiment includes an L-bracket 146 coupled to the bezel 30 and extending therefrom. Similarly the retention features 38 are depicted as defining a flange 150 extending away from the retention features 38 and configured to engage the L-bracket 146. The L-bracket 146 and the flange 150 may each have one half of a hook and loop system 148 (e.g., Velcro®) attached thereto. In the depicted embodiment, the attachment features 34 have the loop side and the retention features 38 have the hook side. Due to the ease of use of hook and loop systems 148, the bezel 30 or inner window assembly 28 may easily be repositioned or separated from the outer window assembly 18 in order to correct alignment with the aircraft fuselage 14. Both high strength industrial grade and household grades of hook and loop systems 148 may suffice. Additionally, unidirectional models of hook and loop systems 148 may also be used. Hook and loop systems 148 having an adhesive backing may be advantageous as they allow for quick positioning and attachment to the L-bracket 146 and the flange 150. The hook and loop systems 148 may be low profile or a normal profile based on the desired distance between the L-bracket 146 and the flange 150. Additionally or alternatively, the hook and loop systems 148 may be positioned directly on perimeters of the bezel 30 and the pressure pane frame 24 in continuous or semi-continuous lengths to allow the bezel 30 to couple directly to the pressure pane frame 24.

Figure 5:
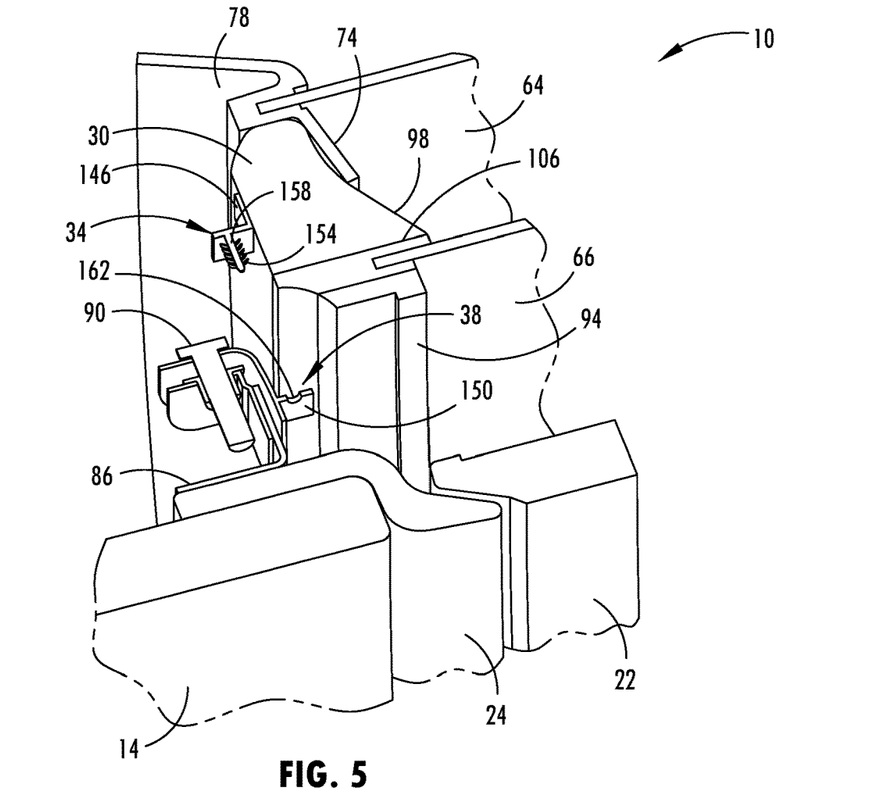
FIG. 5 is a partially exploded bottom perspective view of the aircraft window according to one embodiment.
Figure 5A:
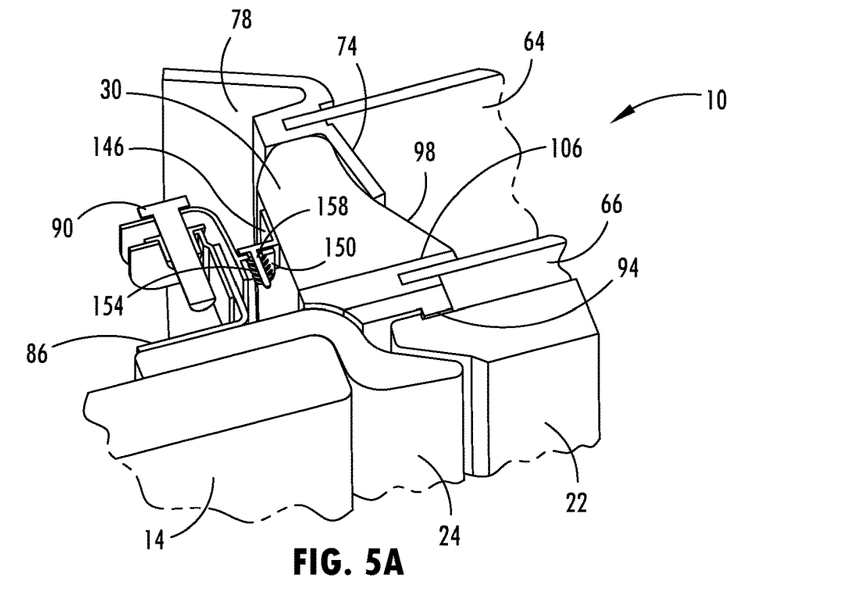
FIG. 5A is a bottom perspective view of the aircraft window after assembly according to the embodiment of FIG. 5.

With reference now to FIGS. 5 and 5A, the attachment features 30 may include a barbed or "Christmas tree" configuration. In barbed embodiments, the attachment features 34 may have a plurality of barbs 154 extending outward from an axis of a stem 158. In the depicted embodiment, the stem 158 extends from the L-bracket 146 and toward the retention features 38. The retention features 38 define an aperture 162 configured to accept the stem 158 and barbs 154. The barbs 154 extend away from the stem 158 at an angle configured to allow easy insertion of the attachment features 34 into the retention features 38, but cause resistance to the removal of the attachment features 34 from the retaining features 38. The angle and size of the barbs 154 may be altered to adjust the force required to separate the attachment features 34 from the retaining features 38 (i.e., separate the bezel 30 from the outer window assembly 18). In the depicted embodiment, the barbs 154 are continuous and swept around the stem 158 of the attachment features 34. In other embodiments, the barbs 154 are thin projections extending away from the stem 158.

In the barbed embodiment of the retention features 38, the flange 150 may define more than just the aperture 162, but a receptacle having a complex geometry (e.g., a plurality of internal protrusions similar or dissimilar to the shape of the barbs 154) configured to engage the barbs 154 of the attachment features 34, thereby affecting the retention force of the retention features 38. In yet other embodiments, the bezel 30 may integrally define one or more of the attachment features 34 in the barbed embodiment. In foam embodiments of the bezel 30, the attachment features 34 may be a denser or more rigid foam. Additionally, one or more barbed attachment features 34 may be used in conjunction with an adhesive to ensure retention of the attachment features 34 within the retention features 38.

Figure 6:
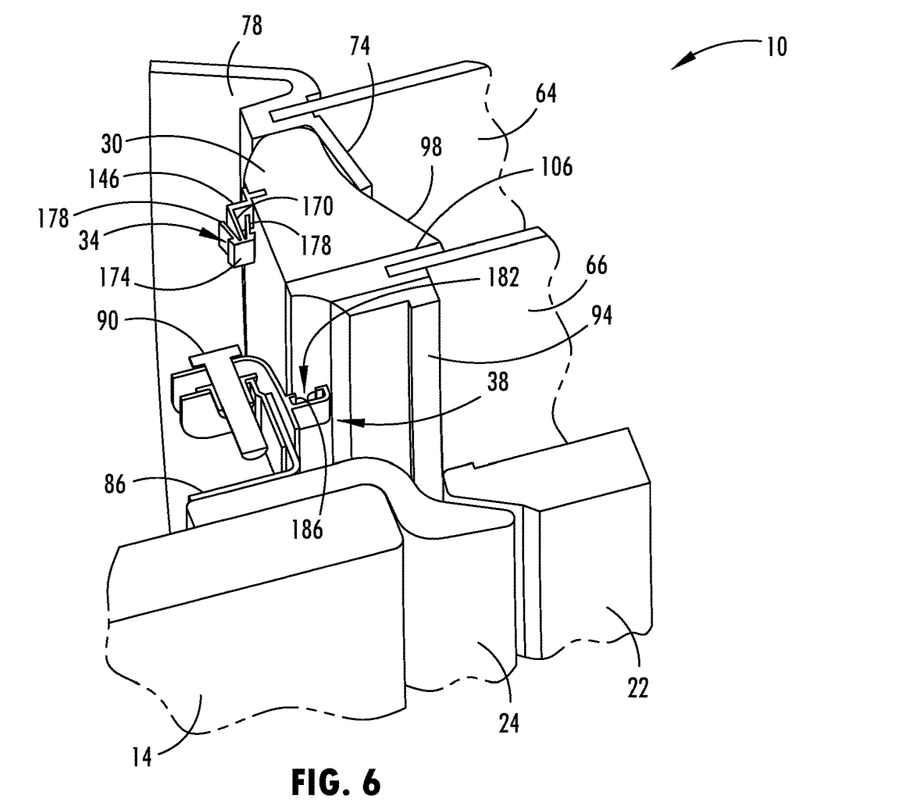
FIG. 6 is a partially exploded bottom perspective view of the aircraft window according to one embodiment.
Figure 6A:
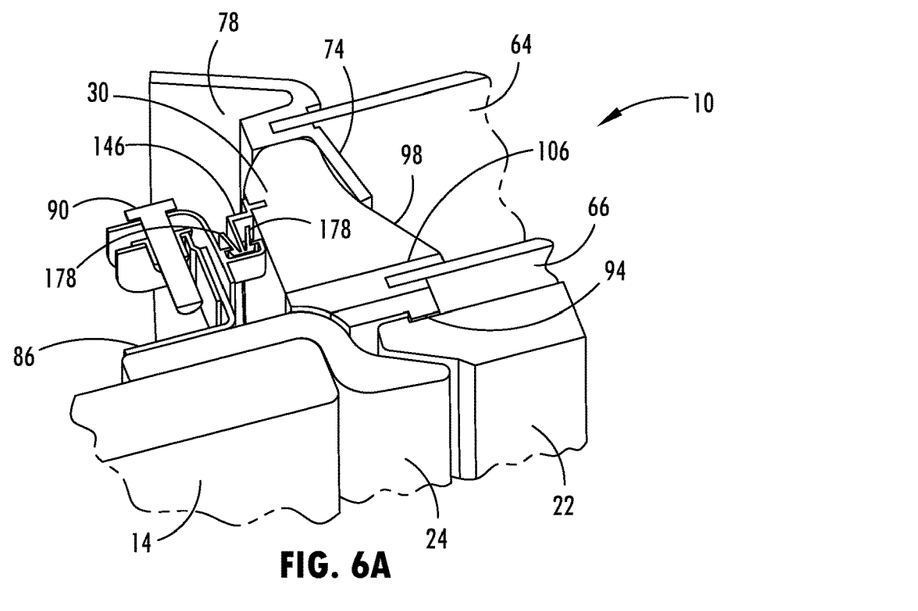
FIG. 6A is a bottom perspective view of the aircraft window after assembly according to the embodiment of FIG. 6.

Referring now to FIGS. 6 and 6A, the attachment features 34 are depicted in a "V-clip" embodiment. The V-clip embodiment of the attachment features 34 includes a connection portion 170 connecting a head 174 to the L-bracket 146. The head 174 may be angled at certain locations to facilitate easier coupling with the retention features 38. A pair of arms 178 extend from the head 174 on either side of the connection portion 170. The retention features 38 define a cavity 182 with adjacent edges 186. In operation, the head 174 is configured to engage the cavity 182 in a snap-fit manner in order to couple the attachment features 34 and the retention features 38. The edges 186 extend over the head 174, when the head 174 is coupled with the cavity 182, to create a retention force which resists the removal of the attachment features 34 from the retention features 38. The edges 186 may be enlarged or shrunk relative to the size of the head 174 to increase or decrease the retention force. The head 174 may be released from the cavity 182 and edges 186 by pinching the arms 178 toward the connection portion 170 such that the head 174 is deformed and it may escape the edges 186. Such an embodiment is advantageous in that it allows a sufficient retention force to be generated between the attachment and retention features 34, 38, but allows easy removal of the attachment features 34 from the retention features 38 by an operator.

Figure 7:
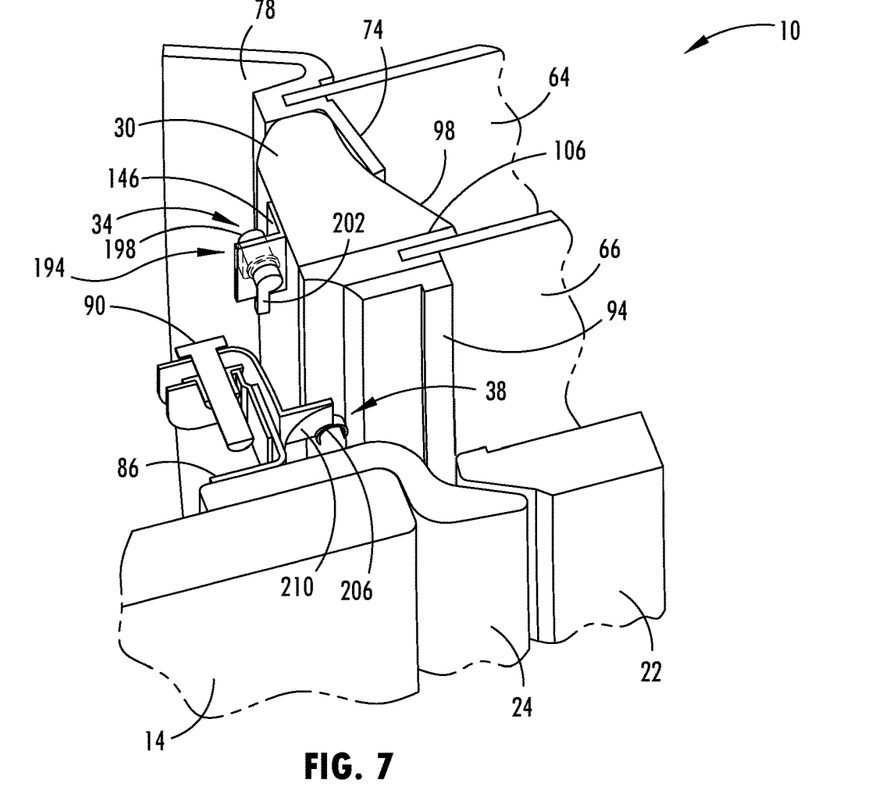
FIG. 7 is a partially exploded bottom perspective view of the aircraft window according to one embodiment.
Figure 7A:
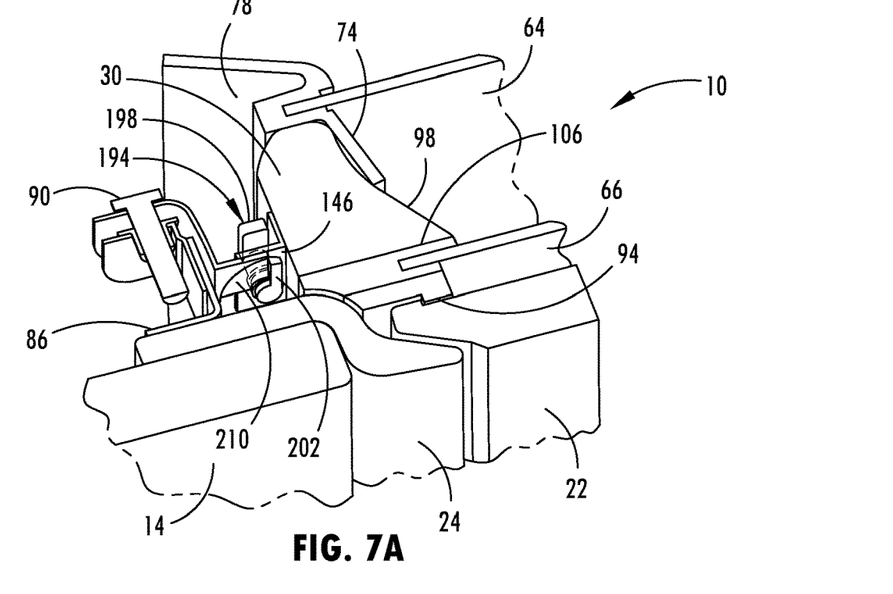
FIG. 7A is a bottom perspective view of the aircraft window after assembly according to the embodiment of FIG. 7.

With reference now to the embodiments depicted in FIGS. 7 and 7A, the attachment features 34 include a rotatable member 194 disposed through the L-bracket 146. The rotatable member 194 includes a handle 198 and an engagement feature 202. The handle 198 is depicted as a rectangular structure, but may be any shape configured to allow gripping and rotating of the rotatable member 194. In some embodiments, the handle 198 is shaped and/or includes impressions configured to accept tool bits (e.g., Philips head bit, flat head bit, hex bit, Allen bit, and socket) to aid in rotation of the handle 198. In the depicted embodiment, the retention features 38 define a collar 206 configured to accept the rotatable member 194 and a retaining surface 210 configured to engage the engagement feature 202. It should be understood that various embodiments of the retention features 38 may not include the collar 206. During connection, as the bezel 30 approaches the outer window assembly 18, the rotatable member 194 passes through the collar 206. The handle 198 may then be rotated such that the engagement feature 202 engages the retaining surface 210 to generate a retaining force which resists separation of the attachment features 34 from the retaining features 38. In some embodiments, the retaining surface 210 and/or the engagement feature 202 may be chamfered so as to cause an increasing retaining force between the attachment features 34 and the retaining features 38 as the engagement feature 202 is rotated across the retaining surface 210. Additionally, the retaining surface 210 and the engagement feature 202 may define complimentary structures (e.g., protrusion and indentation) which are configured to lock the rotatable member 194 in place after a predetermined amount of rotation. Such an engagement style is advantageous in that it allows for both easy attachment and release of the attachment features 34 from the retention features 38 and provides a suitable amount of retention force.

In an alternative embodiment, the engagement feature 202 and the retention features 38 may be shaped to engage in a bayonet configuration. In such an embodiment, the retention features 38 may have a housing extending over the retaining surface 210 defining a cavity into which the engagement feature 202 may be inserted. In bayonet embodiments, the engagement feature 202 and/or the retention surface 210 and/or housing may define features configured to engage one another such that rotation of the rotatable member 194 is resisted. Bayonet embodiments of the attachment and retention features 34, 38 may be advantageous in that a precise amount of compression of the bezel 30 may be attained, as well as a decrease in rattling of the bezel 30 due to the resistance of the inner window assembly 28 to move toward or away from the outer window assembly 18 due to the retaining surface 210 and the housing holding the engagement feature 202 in place.

Figure 8:
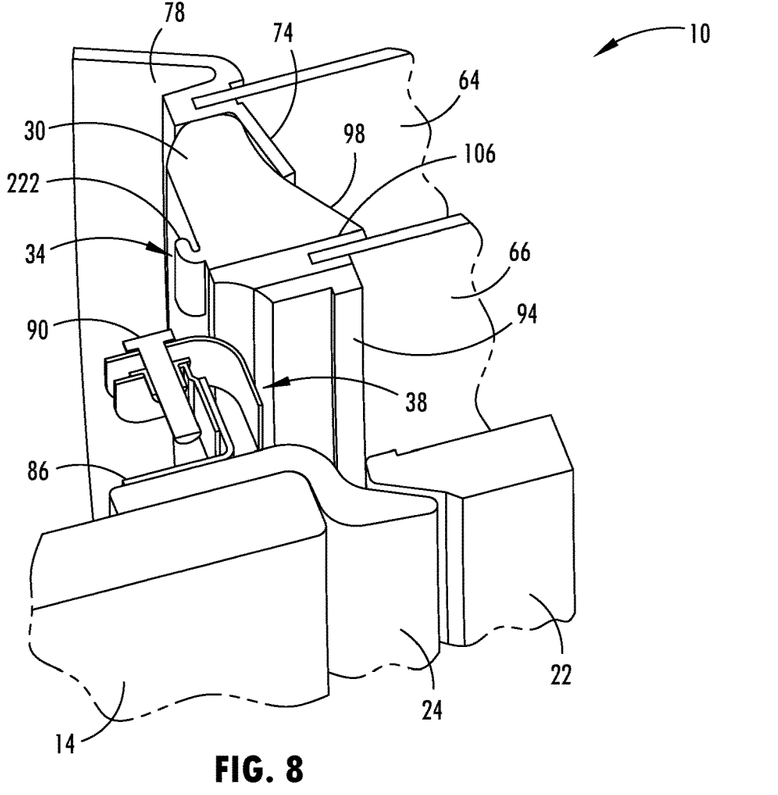
FIG. 8 is a partially exploded bottom perspective view of the aircraft window according to one embodiment.
Figure 8A:
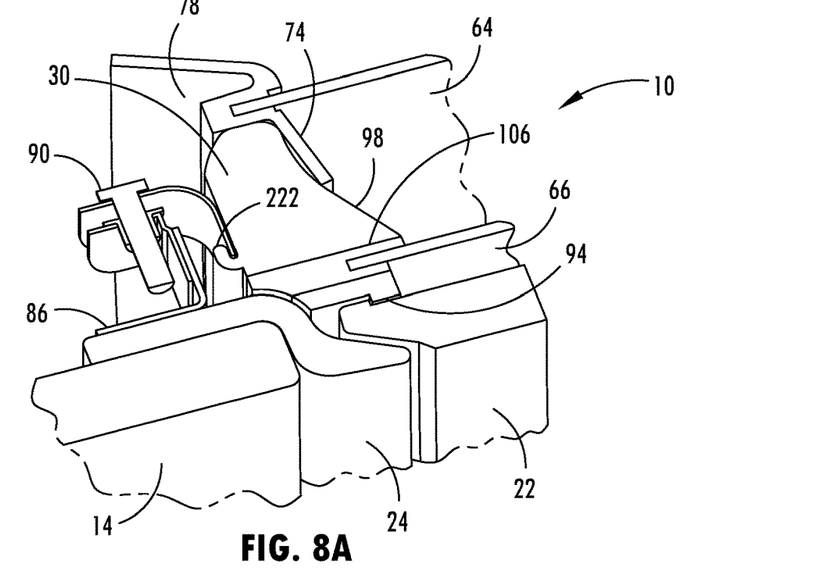
FIG. 8A is a bottom perspective view of the aircraft window after assembly according to the embodiment of FIG. 8.
Figure 8B:
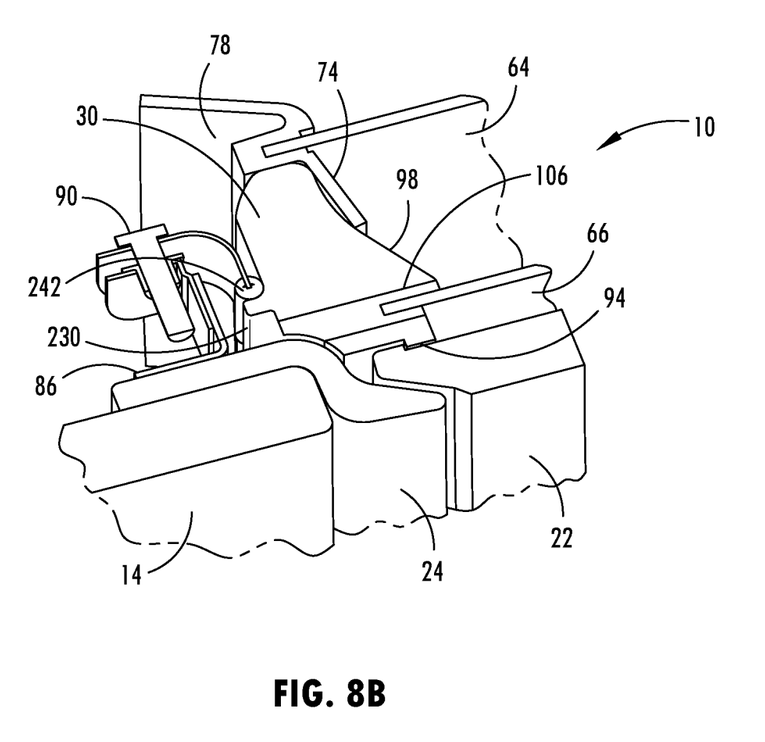
FIG. 8B is a bottom perspective view of the aircraft window after assembly according to another embodiment of FIG. 8.

Referring now to FIGS. 8-8B, the bezel 30 may integrally define the attachment features 34. In the depicted embodiment of FIGS. 8 and 8A, the attachment features 34 are formed as a catch 222 integrally protruding from the bezel 30. The catch 222 may be denser, stronger, or more rigid than the rest of the bezel 30. In some embodiments, the difference in properties between the catch 222 and the bezel 30 may be due to the catch 222 being formed of a different material as compared to the rest of the bezel 30. For example, the catch 222 may be formed of a different material approved for aircraft use than the rest of the bezel 30. In other embodiments, the material of the catch 222 may include the same composition as the rest of the bezel 30, but is processed differently. For example, in foam embodiments of the bezel 30, the catch 222 may be denser and more rigid due to less expansion of the foam, compaction of a localized region, or due to fusing/attaching/integrating of a denser foam and/or different material to the bezel 30. In some embodiments, a dense polymeric foam may be located along the outer wall 54 and utilized as an attachment point to which a fastener (e.g., screw, nail, receptacle) may be screwed into from the retention features 38, thereby securing the bezel 30 to the outer window assembly 18.

FIG. 8B depicts an embodiment of the integrally defined attachment features 34 as a lip 230 which extends around the outer wall 54 of the bezel 30. The lip 230 may be a continuous or semi-continuous structure. In the depicted embodiment, the lip 230 is a protrusion extending from the outer wall 54, but may also be an indentation into the bezel 30. The bezel 30 proximate the lip 230 may be similar in composition, density, or processing to that of the catch 222, as explained above. The retaining features 38 may support a ring 242 extending between each of the retaining features 38 such that the bezel 30 is substantially encircled. It should be understood that the ring 242 may be a discontinuous structure which may extend between only some of the retention features 38. In yet other embodiments, the ring 242 may have no continuous lengths, but rather is formed from a plurality of portions connected to the retention features 38. In assembly, the bezel 30 is compressed against the pressure pane frame 24 and the lip 230 is "rolled" under the ring 242 to hold the bezel 30 in place. The ring 242 then exerts a force on the bezel 30 to keep the bezel 30 from separating from the pressure pane frame 24 as well as keeping the bezel 30 in a compressed state.

It will be understood that although particular configurations have been described for the attachment features 34 and the retention features 38, the configurations may be swapped where applicable. For example, the V-clip embodiment of FIGS. 6 and 6A may be reversed such that the head 174 and arms 178 are defined on the retention features 38 and the cavity 182 and edges 186 are on the attachment features 34. It should also be understood that the embodiments of the attachment and retention features 34, 38 discussed above may be, where applicable, integral to the bezel 30, incorporate magnets or be magnetized, or use an additional adhesive to aid in retention of the attachment features 34 to the retention features 38. Additionally, it should be understood that the more than one embodiment of the attachment and retention features 34, 38 may be used at a time to couple the inner window assembly 28 to the outer window assembly 18. For example, some attachment and retention features 34, 38 may include the hook and loop system 148 and some attachment and retention features 34, 38 may include the barbed configuration.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An aircraft window, comprising:
   an outer window assembly including a pressure pane coupled to a pressure pane frame;
   an inner window assembly including a bezel adapted to couple to a perimeter of the inner window assembly against the outer window assembly, wherein the bezel has a plurality of attachment hooks with an enlarged end disposed thereon; and
   a plurality of flexible retention hooks disposed around the outer window assembly, wherein the flexible retention hooks each include a distal end defining an engagement surface configured to engage the enlarged end of the plurality of attachment hooks for retaining the inner window assembly to the outer window assembly by snap-fit engagement.

2. The aircraft window of claim 1, wherein the flexible retention hooks are positioned on the pressure pane frame.

3. The aircraft window of claim 1, wherein the bezel defines an inner opening having an inner wall, the inner wall defining a channel configured to accept an electro-optic element.

4. The aircraft window of claim 1, wherein the attachment hooks and the flexible retention hooks each include an installation surface defining a slip plane, wherein the installation surface of the attachment hooks side past the installation surface of the flexible retention hooks during installation.

5. The aircraft window of claim 1, wherein the attachment hooks are integrally defined with the bezel.

6. The aircraft window of claim 1, wherein the attachment hooks and the flexible retention hooks each define a flat engagement surface.

7. The aircraft window of claim 1, wherein the attachment hooks and the flexible retention hooks are magnetized.

* * * * *